(12) United States Patent
Cho

(10) Patent No.: US 10,755,204 B2
(45) Date of Patent: Aug. 25, 2020

(54) ELECTRIC VEHICLE RETURN MANAGEMENT FOR ELECTRIC VEHICLE SHARING SERVICE

(71) Applicant: KT CORPORATION, Gyeonggi-do (KR)

(72) Inventor: Young-An Cho, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 884 days.

(21) Appl. No.: 14/159,960

(22) Filed: Jan. 21, 2014

(65) Prior Publication Data

US 2014/0207498 A1 Jul. 24, 2014

(30) Foreign Application Priority Data

Jan. 21, 2013 (KR) .................. 10-2013-0006291

(51) Int. Cl.
*G06Q 20/22* (2012.01)
*H02J 7/00* (2006.01)
(Continued)

(52) U.S. Cl.
CPC .............. *G06Q 10/02* (2013.01); *B60L 53/12* (2019.02); *B60L 53/14* (2019.02); *B60L 53/64* (2019.02); *B60L 53/65* (2019.02); *B60L 53/665* (2019.02); *G06Q 30/0645* (2013.01); *G06Q 50/30* (2013.01); *H02J 7/02* (2013.01); *H02J 7/025* (2013.01); *H02J 50/00* (2016.02); *H02J 50/40* (2016.02); *H02J 50/90* (2016.02);
(Continued)

(58) Field of Classification Search
CPC .... G06Q 10/02; G06Q 50/30; G06Q 30/0645; G06Q 10/047; G06Q 10/0631; G06Q 10/06315; G06Q 50/10; G06Q 10/025; B60L 11/1816; B60L 11/182; B60L 11/184; B60L 11/1846; B60L 11/1848; B60L 2250/12; B60L 2260/54; B60L 2250/14; B60L 2260/58; B60L 2250/20; H02J 7/025; Y02T 90/128; Y02T 90/122; Y02T 90/163; Y02T 10/7005; Y02T 10/7072; Y02T 90/169; Y02T 90/121; Y02T 90/14; Y02T 10/7088; Y02T 90/162; Y02T 90/12; Y04S 30/14; G07C 5/008; G07C 5/00; G07C 5/004; G07C 5/08

See application file for complete search history.

(56) References Cited

U.S. PATENT DOCUMENTS

2004/0073440 A1* 4/2004 Garbers .................. G06Q 10/02
705/5
2005/0216296 A1 9/2005 Kokubu
(Continued)

FOREIGN PATENT DOCUMENTS

JP 2005-310102 A 11/2005
JP 2011-095880 A 5/2011
(Continued)

*Primary Examiner* — Maroun P Kanaan
(74) *Attorney, Agent, or Firm* — IP Legal Services, LLC

(57) ABSTRACT

The disclosure is related to managing an electric vehicle return process based on whether a return condition associated with an electric charging of a returned electric vehicle is satisfied. Furthermore, a benefit or a penalty may be given to a corresponding user according to whether the return condition associated with an electric charging is satisfied.

13 Claims, 10 Drawing Sheets

(51) Int. Cl.
*G06Q 10/02* (2012.01)
*H02J 50/00* (2016.01)
*H02J 7/02* (2016.01)
*H02J 50/40* (2016.01)
*H02J 50/90* (2016.01)
*G06Q 50/30* (2012.01)
*G06Q 30/06* (2012.01)
*B60L 53/66* (2019.01)
*B60L 53/12* (2019.01)
*B60L 53/65* (2019.01)
*B60L 53/64* (2019.01)
*B60L 53/14* (2019.01)

(52) U.S. Cl.
CPC ....... *B60L 2250/12* (2013.01); *B60L 2250/14* (2013.01); *B60L 2250/20* (2013.01); *B60L 2260/54* (2013.01); *B60L 2260/58* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| 2007/0163820 | A1* | 7/2007 | Hoogenraad | B60K 6/48 180/65.28 |
| 2010/0280700 | A1* | 11/2010 | Morgal | G06Q 10/02 701/31.4 |
| 2011/0025267 | A1* | 2/2011 | Kamen | B60L 8/003 320/109 |
| 2013/0110340 | A1 | 5/2013 | Park et al. | |
| 2014/0114448 | A1* | 4/2014 | Outwater | B60L 11/1825 700/90 |

FOREIGN PATENT DOCUMENTS

| JP | 2011-128987 A | 6/2011 |
| JP | 2012-164210 A | 8/2012 |
| KR | 10-1006598 B1 | 1/2011 |
| KR | 10-2011-0095106 A | 8/2011 |
| KR | 10-2011-0129511 A | 12/2011 |
| KR | 10-2012-0012652 A | 2/2012 |
| KR | 10-2012-0108199 A | 10/2012 |

* cited by examiner

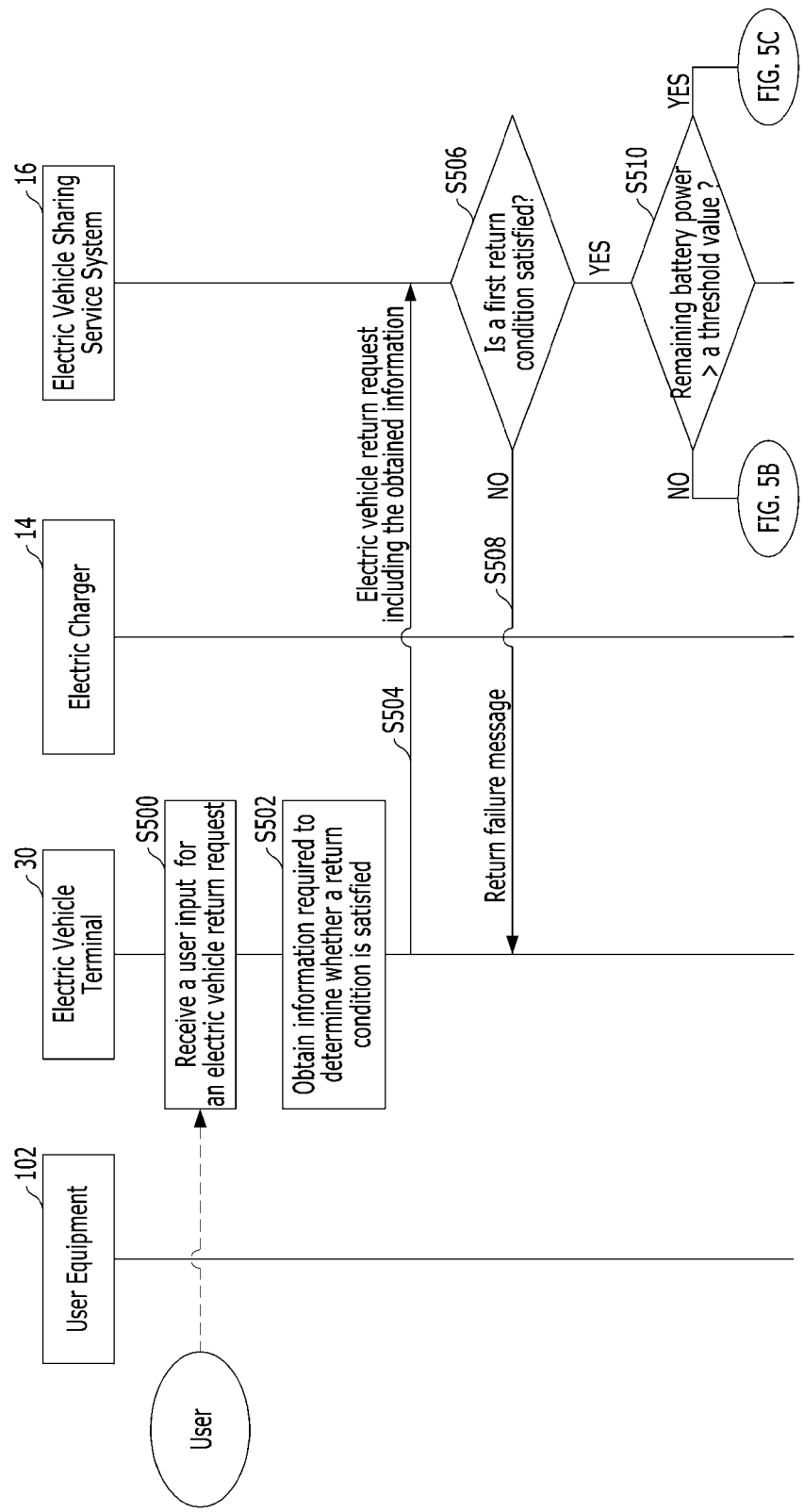

ELECTRIC VEHICLE RETURN MANAGEMENT FOR ELECTRIC VEHICLE SHARING SERVICE

CROSS REFERENCE TO PRIOR APPLICATIONS

The present application claims priority under 35 U.S.C. § 119 to Korean Patent Application No. 10-2013-0006291 (filed on Jan. 21, 2013), which is hereby incorporated herein by reference in its entirety.

TECHNICAL FIELD

The present disclosure relates to an electric vehicle sharing service and, in particular, to managing an electric vehicle return in an electric vehicle sharing service.

BACKGROUND

A car sharing service may refer to a kind of car rental where people rent cars for short periods of time, often by the hour. Utilization of the car sharing service is increasing because of overcoming traffic congestion, a parking lot shortage, an environmental industrial pollution, expenditure and maintenance costs according to a car ownership, and so forth. Particularly, the electric vehicle sharing service is rapidly increasing in view of environment-friendly energy-savings.

In case of electric vehicles, a considerable time might be taken to charge an electric vehicle. In the case that a returned electric vehicle is not properly charged, a next EV sharing service using the returned electric vehicle may not be quickly provided, and thereby reducing an entire management efficiency of the electric vehicle sharing service. Furthermore, in the case that a returned electric vehicle is not properly charged, extra workers (or extra expenditure) for electric charging of returned electric vehicles may be required, and thereby causing an increase in an EV sharing service price.

As discussed above, in an electric vehicle sharing service, electric charging of electric vehicles is a main issue. However, electric vehicle sharing service users incline to pay no attention to charging a returned electric vehicle because of a short-time utilization and a lack of ownership. Accordingly, an efficient charging management directed to the returned electric vehicles may be required. Particularly, inducing users to actively perform an electric charging of returned electric vehicles may be required.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, an electric vehicle sharing service system may manage an electric vehicle return process based on whether a return condition associated with an electric charging of a returned electric vehicle is satisfied. Furthermore, the electric vehicle sharing service system may give a benefit or a penalty to a corresponding user according to whether the return condition associated with an electric charging is satisfied.

In accordance with at least one embodiment, a method may be provided for managing an electric vehicle return process in an electric vehicle sharing service system. The method may include receiving a return request for an electric vehicle from at least one of user equipment and an electric vehicle terminal, determining whether a first return condition is satisfied, wherein the first return condition includes whether the electric vehicle is at a predetermined return location, determining whether a second return condition associated with an electric charging of the electric vehicle is satisfied, and determining that an electric vehicle return procedure is complete when the first and second return conditions are satisfied.

The first return condition may further include at least one of whether an electric motor of the electric vehicle is off, and whether a user authentication is successful.

The determining the second return condition may include checking a charging connection between the electric vehicle and an electric charger.

The determining the second return condition may include receiving charging connection information from at least one of the electric vehicle terminal of the electric vehicle and the electric charger connected to the electric vehicle, and determining whether the charging connection is established, based on the received charging connection information.

The charging connection may be established according to at least one of a wired charging scheme and a wireless charging scheme.

The determining the second return condition may further include determining whether a remaining battery power of the electric vehicle exceeds a threshold value. Herein, the remaining battery power may be obtained from the electric vehicle terminal or the electric charger connected to the electric vehicle. The determining the second return condition may be performed when the remaining battery power of the electric vehicle exceeds the threshold value.

The method may further include determining a benefit for a corresponding user when the second return condition is satisfied, and transmitting information on the benefit to the user equipment.

The method may further include transmitting a guide message requesting an electric charging connection, to user equipment when the second return condition is not satisfied.

The method may further include determining a penalty for a corresponding user when the second return condition is not satisfied, and transmitting information on the penalty to the user equipment.

The method may further include transmitting a charging approval message to the connected electric charger such that the connected electric charger performs an electric charging process, when the second return condition is satisfied, and transmitting information on the electric charging process to the user equipment.

The method may further include transmitting a lock control signal to the electric vehicle terminal such that the electric vehicle terminal perform a locking process for the electric vehicle.

The method may further include performing an electric charging reservation for the electric vehicle.

The performing the electric charging reservation may include collecting charging related information from one or more electric chargers, determining availability of at least one electric charger for an electric vehicle return of each user, based on an electric vehicle reservation content, providing information on the determined at least one electric charger to a corresponding user equipment. receiving user selection information from the corresponding user equipment, and performing the electric charging reservation according to the user selection information.

The receiving the charging connection information may include receiving an electric charging authentication request from the user equipment, obtaining electric charger identification information from the electric charging authentication request, transmitting a charging connection information request to an electric charger corresponding to the electric charger identification information, and receiving the charging connection information from the corresponding electric charger.

In accordance with other embodiments, a method may be provided for managing an electric vehicle return process in an electric vehicle terminal. The method may include transmitting an electric vehicle return request to an electric vehicle sharing service system, obtaining charging connection information by monitoring whether a returned electric vehicle is connected to an electric charger, and transmitting the charging connection information to the electric vehicle sharing service system such that the electric vehicle sharing service system determines whether a return condition associated with an electric charging of the returned electric vehicle is satisfied.

The method may further include performing a locking process for the returned electric vehicle.

The performing the locking process may be performed (i) when a user authentication for the locking process is successful, or (ii) when a lock control signal is received from the electric vehicle sharing service system.

In accordance with still other embodiments, a method may be provided for managing an electric vehicle return process in an electric charger. The method may include transmitting information on a charging connection between a returned electric vehicle and the electric charger, to an electric vehicle sharing service system, and performing an electric charging process associated with the returned electric vehicle when a charging approval message is received from the electric vehicle sharing service system.

The method transmitting may be performed (i) when a charging connection information request is received from the electric vehicle sharing service system, or (ii) when an electric charging request is inputted by a user.

The method may further include transmitting charging related information to the electric vehicle sharing service system, and performing an electric charging reservation for the returned electric vehicle according to a request of the electric vehicle sharing service system.

BRIEF DESCRIPTION OF THE DRAWINGS

The above and/or other aspects of some embodiments of the present invention will become apparent and more readily appreciated from the following description of embodiments, taken in conjunction with the accompanying drawings, of which:

FIG. 5A through 5C illustrate a method of performing a return process of an electric vehicle in an electric vehicle sharing service in accordance with at least one embodiment;

DETAILED DESCRIPTION OF EMBODIMENTS

Figure 1:
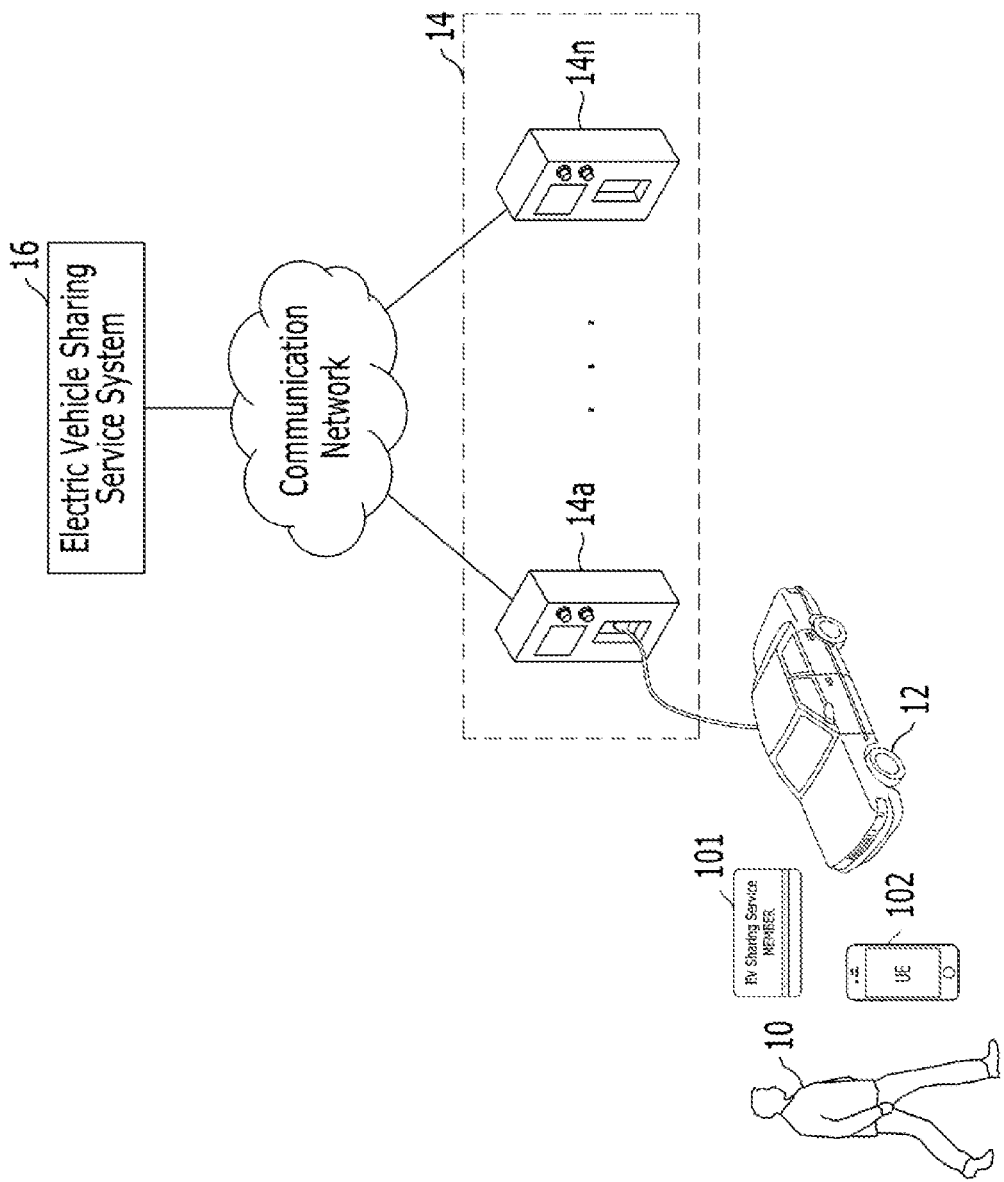
FIG. 1 illustrates interworking between systems for managing an electric vehicle sharing service to which the present embodiment is applied.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

The present embodiment may manage an electric vehicle return process based on whether a return condition associated with an electric charging of a returned electric vehicle is satisfied. Furthermore, a benefit (an incentive, a discount, etc.) or a penalty may be given to a corresponding user according to whether the return condition associated with an electric charging is satisfied.

FIG. 1 illustrates interworking between systems for managing an electric vehicle sharing service to which the present embodiment is applied. Hereinafter, the term "electric vehicle (EV) sharing service" is used as a general concept that includes a variety of EV utilization services (e.g., electric car sharing service, a car rent service, etc.) associated electric vehicles owned and/or managed by a different entity.

Referring to FIG. 1, a user (e.g., 10) may use an electric vehicle (EV) (e.g. 12) for a predetermined time period, through an electric vehicle (EV) sharing service. When an electric vehicle (EV) utilization is finished, the user (e.g., 10) may return a corresponding electric vehicle. In this case, a user authentication procedure associated with 'an electric vehicle (EV) utilization' or 'an electric vehicle (EV) return' may be performed through a variety of authentication means (e.g., a membership card 101, an authentication chip, an authentication application installed user equipment 102, etc.) and/or authentication information (e.g., a membership identification, a password, etc.).

A user (e.g., 10) may perform a variety of procedures (e.g., an electric vehicle reservation, an electric charging reservation, a user authentication) associated with an electric vehicle utilization and an electric vehicle return, through user equipment 102. Furthermore, when an electric vehicle utilization is finished, user equipment 102 may receive information on a benefit or a penalty from electric vehicle sharing service system 16.

Meanwhile, electric vehicle sharing service system 16 may manage an electric vehicle sharing service to be provided to the user (e.g., 10). More specifically, electric vehicle sharing service system 16 may perform a sharing service reservation management, a sharing service membership management, an electric vehicle utilization management, an electric vehicle management, an electric vehicle return management, an electric vehicle charging management, a user authentication procedure, and so forth. Particularly, electric vehicle sharing service system 16 may manage an electric vehicle return process based on whether an EV return condition (i.e., a second return condition described later) associated with an electric charging of a returned electric vehicle is satisfied (e.g., whether a returned electric vehicle is connected to an electric charger, and/or whether a remaining battery power amount exceeds a threshold value). Furthermore, electric vehicle sharing service system 16 may determine a benefit or a penalty for a corresponding user according to whether the return condition associated with an electric charging is satisfied. Electric vehicle sharing service system 16 may be connected to electric chargers (e.g., 14a, . . . , 14n) through a wired/wireless telecommunication network, in order to perform an electric vehicle charging management of returned electric vehicles. In this case, electric vehicle sharing service system 16 may communicate with each electric charger (e.g., 14a, . . . , or 14n), and control each electric charger (e.g., 14a, . . . , or 14n).

Figure 8:
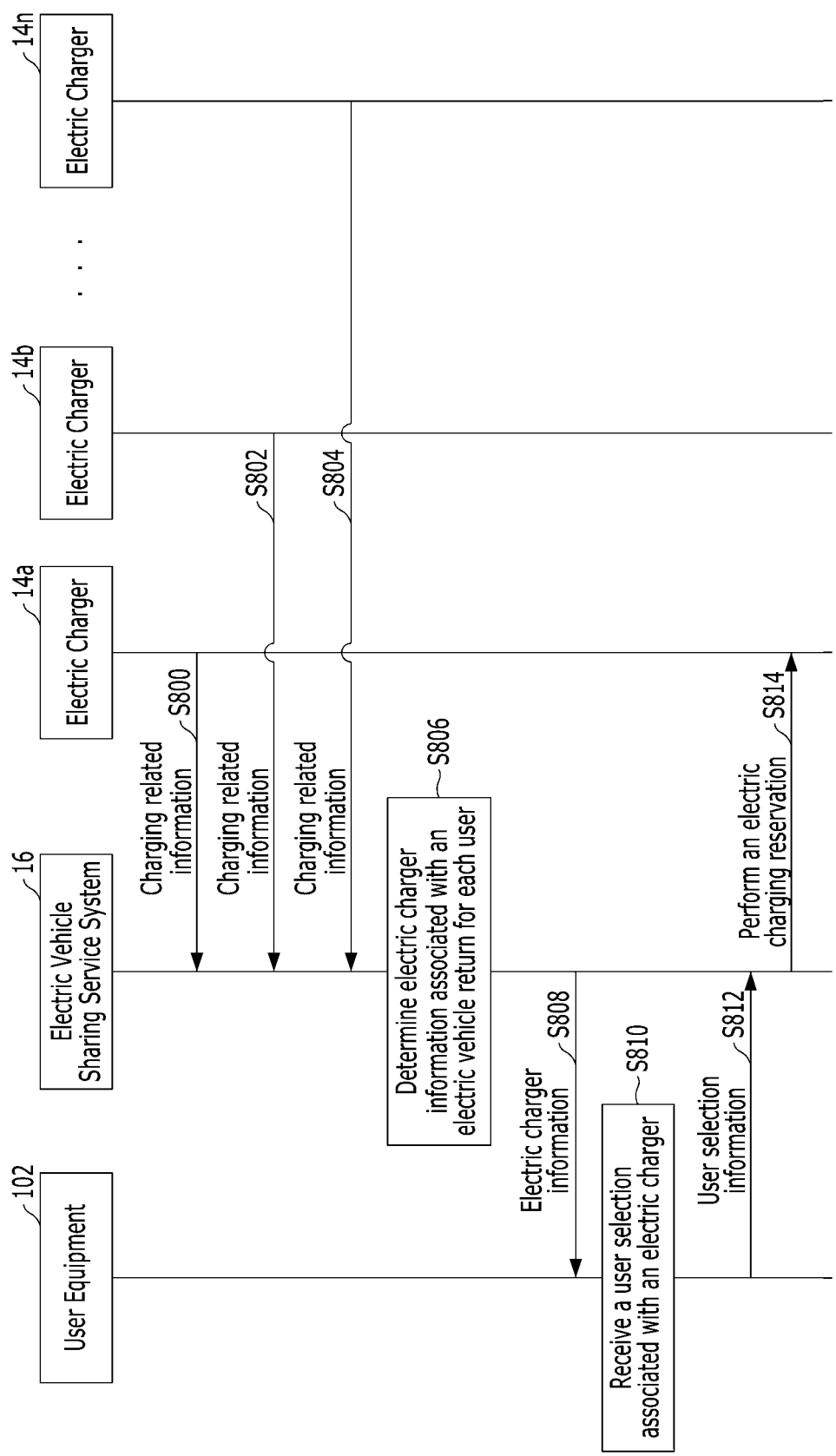
FIG. 8 illustrates a method of performing an electric charging reservation for an electric vehicle to be returned, in accordance with at least one embodiment.

One or more electric chargers (e.g., 14a, . . . , 14n) may be deployed in a specific area. Alternatively, one or more electric chargers (e.g., 14a, . . . , 14n) may be distributed and deployed a various positions (e.g., roads, buildings, etc.) not being restricted to a specific area. Herein, electric chargers (e.g., 14a, . . . , 14n) may include a display screen (e.g., a touch screen display unit) for displaying a charging condition and for receiving a user selection, and/or an individual electric power meter. Each of electric chargers (e.g., 14a, . . . , 14n) may be connected to electric vehicle sharing service system 16 through a wired communication network or a wireless communication network. Each of electric chargers (e.g., 14a, . . . , 14n) may include a processor. Herein, the processor may (i) communicate with electric vehicle sharing service system 16, (ii) perform a control command of electric vehicle sharing service system 16, (iii) obtain user authentication information from a variety of authentication means (e.g., a membership card 101), (iv) obtain connection information (e.g., charging connection information associated with whether electric vehicle 12 is connected to electric charger 14), (v) obtain a remaining battery power amount of a connected electric vehicle, (vi) receive/process/transfer a user input information, and so forth. Furthermore, the processor of each electric charger (e.g., 14a, . . . , 14n) may provide 'charging related information' (e.g., information on an electric charger state and an electric charging schedule associated with a corresponding electric charger) to electric vehicle sharing service system 16, as shown in FIG. 8. When receiving a charging reservation request for a specific electric vehicle to be returned, the processor of each electric charger (e.g., 14a, . . . , 14n) may establish an electric charging schedule.

Figure 7A:
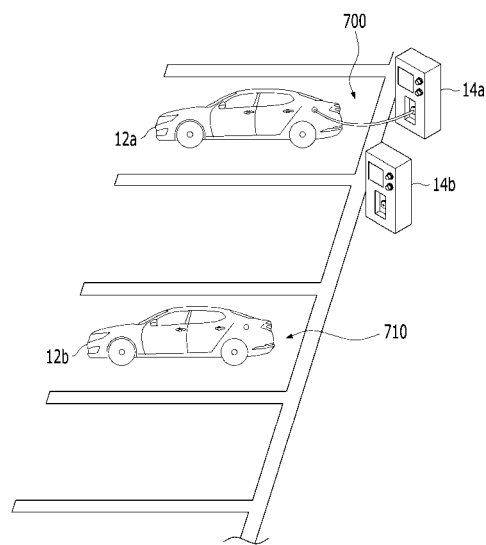
FIGS. 7A and 7B illustrate return states of an electric vehicles returned after using electric vehicle sharing services in accordance with at least one embodiment.
Figure 7B:
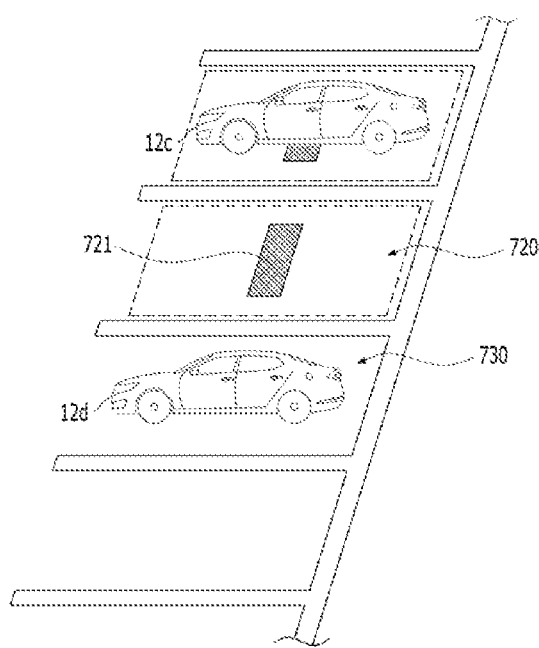

Meanwhile, electric chargers (e.g., 14a, . . . , 14n) may charge electric vehicles (e.g., 12), using a wired charging scheme as shown in FIG. 7A. In other embodiments, electric chargers (e.g., 721) may charge electric vehicles, using a wireless charging scheme as shown in FIG. 7B.

Electric vehicles (EVs) may include electric cars (e.g., 12), electric motorcycles, and/or electric motorbikes, but are not limited thereto.

Figure 2:
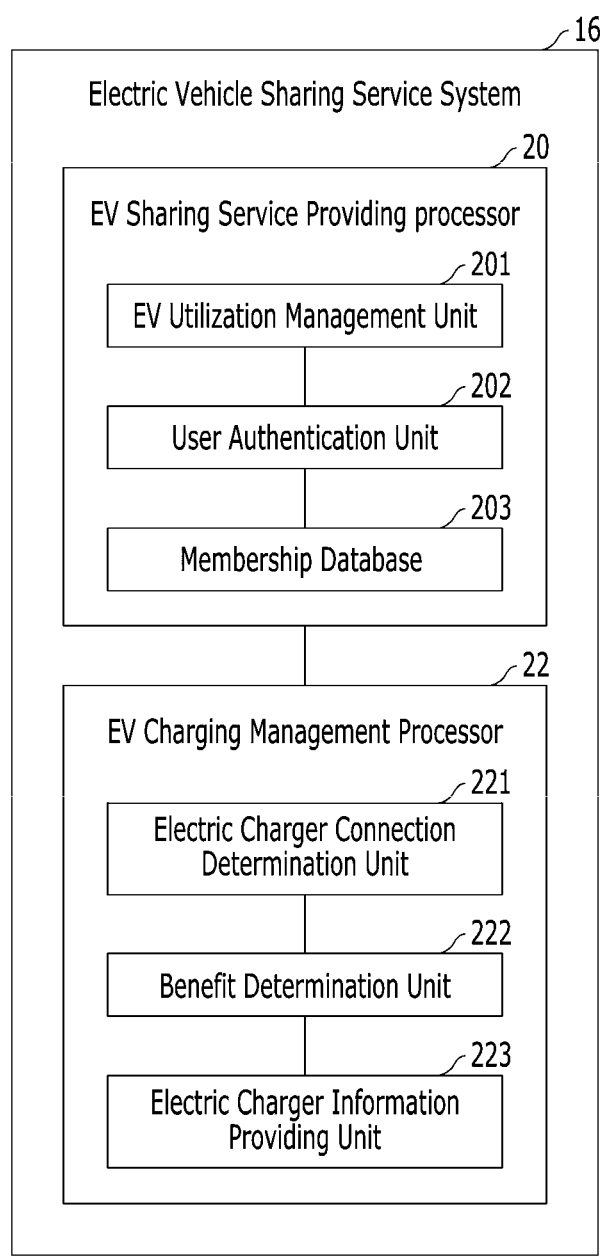
FIG. 2 is a block diagram illustrating a detailed structure of an electric vehicle sharing service system in accordance with at least one embodiment.

FIG. 2 is a block diagram illustrating a detailed structure of an electric vehicle sharing service system in accordance with at least one embodiment.

As shown in FIG. 2, electric vehicle (EV) sharing service system 16 may include electric vehicle (EV) sharing service providing processor (hereinafter referred to as "EV sharing service providing processor") 20 and electric vehicle (EV) charging management processor (hereinafter referred to as "EV charging management processor") 22. Electric vehicle (EV) sharing service system 16 may perform operations described later with reference to FIG. 4 through FIG. 8. Accordingly, the detailed descriptions thereof will be omitted herein. Each constituent element of electric vehicle (EV) sharing service system 16 will be briefly described.

EV sharing service providing processor 20 may provide and manage an EV sharing service such as a sharing service reservation, a sharing service membership management, and an electric vehicle management.

More specifically, EV sharing service providing processor 20 may include EV utilization management unit 201, user authentication unit 202, and membership database 203.

Herein, EV utilization management unit 201 corresponding to a sub-processor may perform basic functions associated with an electric vehicle sharing service. The basic functions may include a sharing service reservation, an electric vehicle return management (e.g., an electric vehicle return management associated with a first return condition described later), a scheduling management of electric vehicles, and so forth. Furthermore, EV utilization management unit 201 may determine a corresponding service expense when an EV sharing service utilization associated with a specific user is complete. In this case, a benefit or penalty determined by benefit determination unit 221 may be reflected on the corresponding service expense. When an electric vehicle return process is complete, EV utilization management unit 201 may transmit return completion messages (S546, S562, S638, S660). A transmission process of such return completion messages will be described in more detail with reference to FIG. 5B through FIG. 6B.

User authentication unit 202 corresponding to a sub-processor may perform a user authentication procedure associated with an EV sharing service. Herein, the user authentication procedure may include a user authentication for an electric vehicle utilization, a user authentication for an electric vehicle return, a user authentication for an electric vehicle charging, and so forth.

Membership database 203 may store personal information (e.g., telephone numbers, email addresses, other user identification information, etc.) of registered members, reservation contents (i.e., a kind of EV sharing service contract content) associated with an EV sharing service, information associated with an EV sharing service utilization, information on benefits (e.g., incentives, discounts, etc.) and penalties, and so forth.

Meanwhile, EV charging management processor 22 may determine whether a second return condition associated with an electric charging of a returned electric vehicle is satisfied (e.g., whether a returned electric vehicle is connected to an electric charger), and determine a benefit or a penalty to be given to a corresponding service user according to a determination result of the second return condition.

More specifically, EV charging management processor 22 may include electric charger connection determination unit 221 (or may be referred to "charging connection determination unit"), benefit determination unit 222, and electric charger information providing unit 223.

Figure 5B:
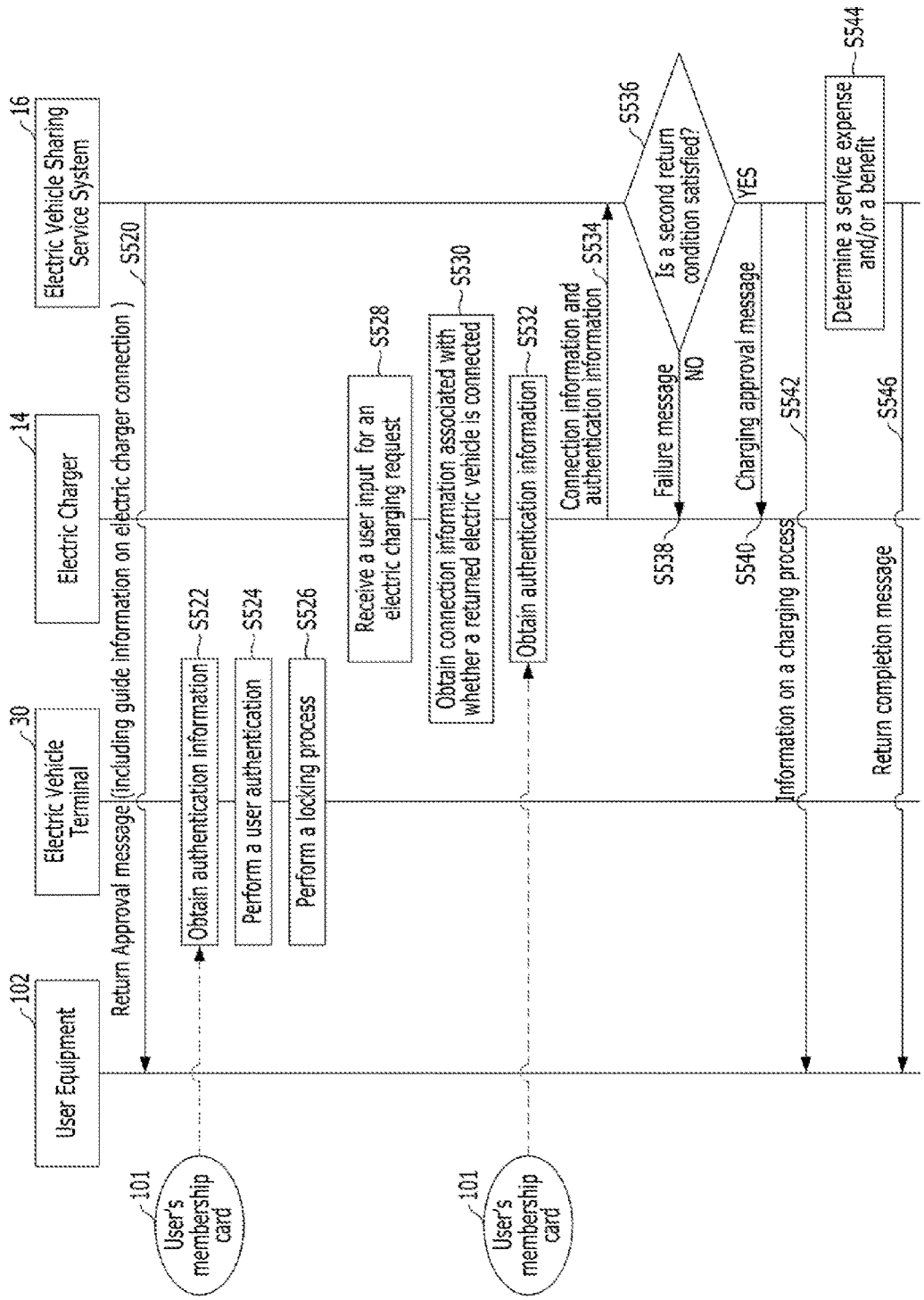
Figure 5C:
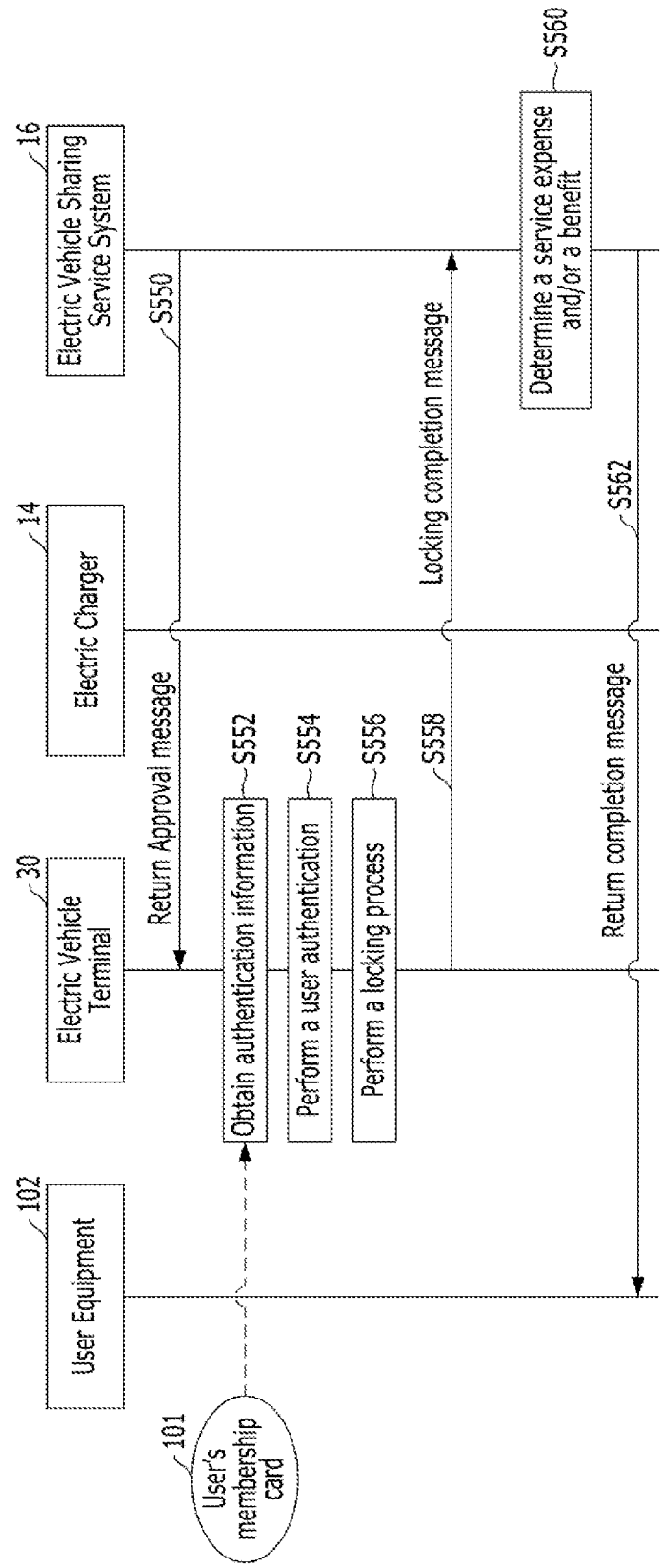
Figure 6A:
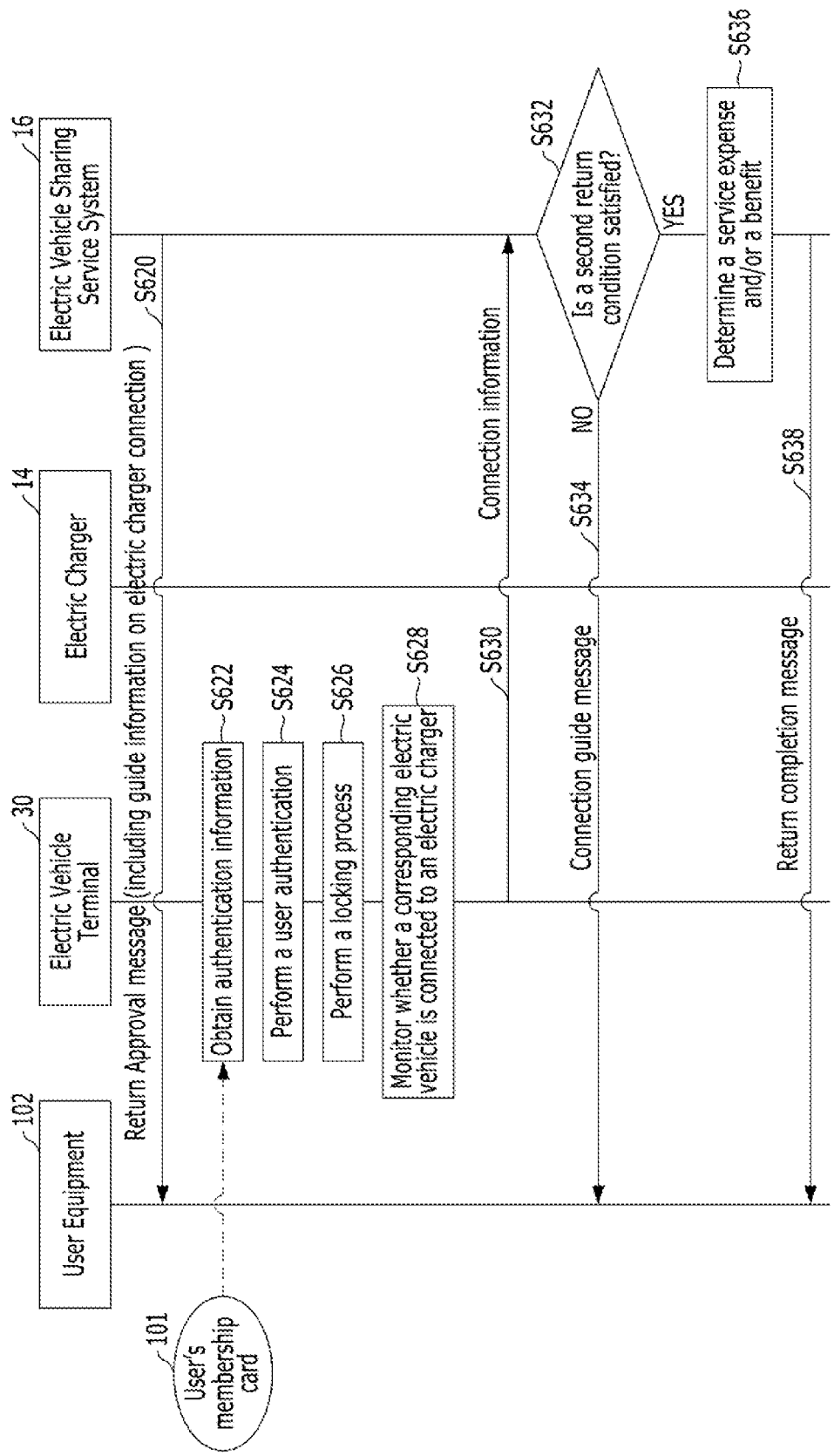
FIG. 6A and FIG. 6B illustrate other methods of performing an electric vehicle return procedure in the case that a remaining battery power amount does not exceed a threshold value in accordance with at least one embodiment.
Figure 6B:
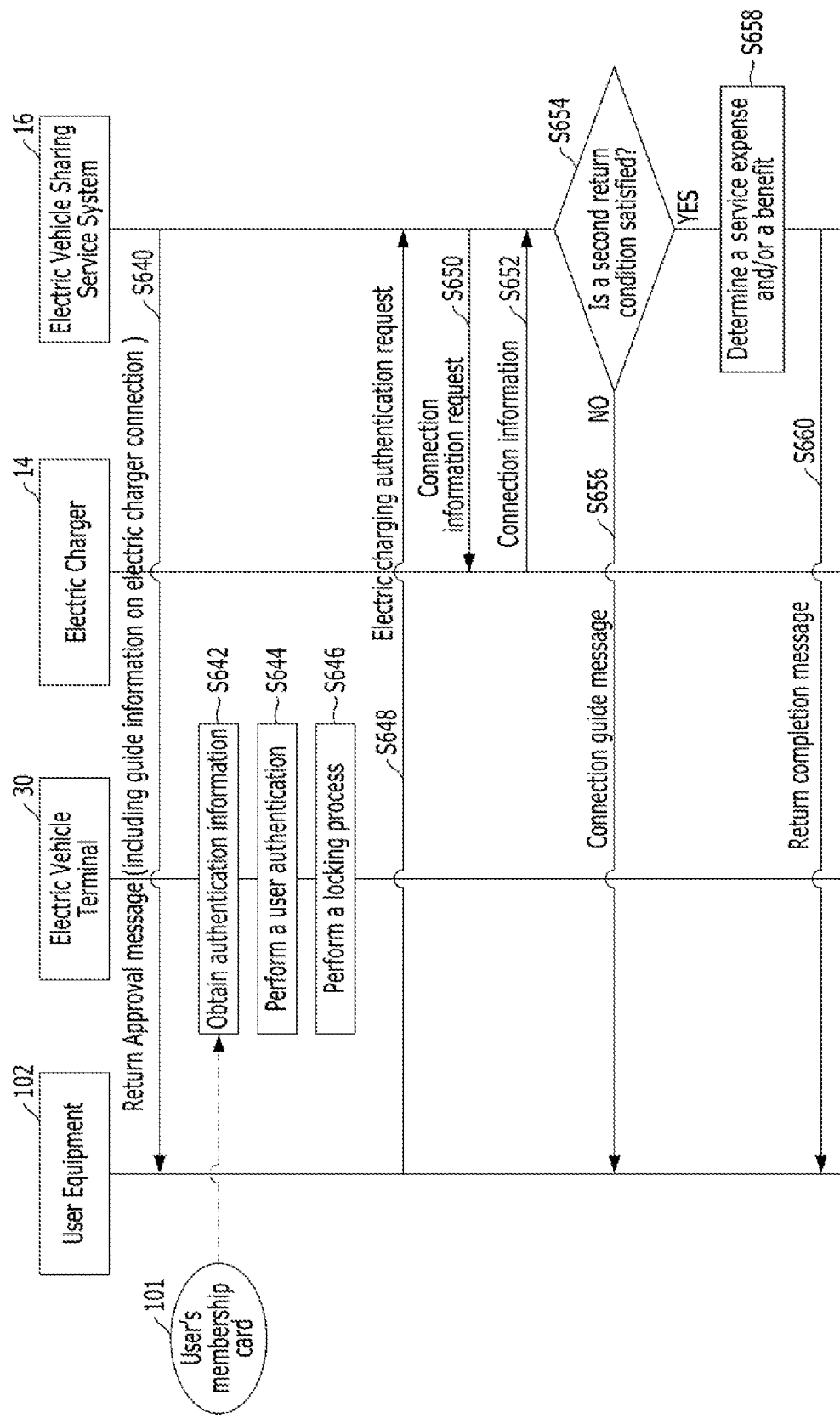

Herein, electric charger connection determination unit 221 corresponding to a sub-processor may obtain connection information (i.e., information on a charging connection between a returned electric vehicle and an electric charger) from at least one of a corresponding electric charger (e.g., 14a, . . . , or 14n) and an electric vehicle terminal (e.g., 30), according to an electric vehicle return procedure (e.g., FIG. 5B, FIG. 6A, or FIG. 6B). Electric charger connection determination unit 221 may determine whether a returned electric vehicle is connected to an electric charger (e.g., 14a, . . . , or 14n), based on the obtained connection information. Furthermore, electric charger connection determination unit 221 may transmit a variety of messages according to a determination of a second return condition associated with an electric charging of a returned electric vehicle. Herein, the variety of message may include a failure message (538), a charging approval message (S540), a message (S542) including information on a charging process, a connection guide message (i.e., a guide message for an electric charging connection) (S634, S656), and so forth. A transmission process of such messages will be described in more detail with reference to FIG. 5B through FIG. 6B, Benefit determination unit 222 corresponding to a sub-processor may determine a benefit (e.g., an incentive, a discount, etc.) for a corresponding sharing service user if a returned electric vehicle is determined to be connected to an electric charger. Benefit determination unit 222 may impose a penalty on a corresponding sharing service user if a returned electric vehicle is determined to be not connected to an electric charger. In summary, benefit determination unit 222 may determine a benefit or a penalty for a corresponding sharing service user, by matching a user authentication procedure (i.e., a user authentication associated with an electric vehicle return) of EV sharing service providing processor 20 and a connection procedure of electric charger connection determination unit 221. Furthermore, benefit determination unit 222 may reflect the determined benefit or penalty information in a corresponding membership information stored in membership database 203. In other embodiments, electric charger connection determination unit 221 may determine whether a remaining battery power amount exceeds a threshold value. In this case, benefit determination unit 222 may give a benefit to a corresponding sharing service user if the remaining battery power amount exceeds the threshold value.

Electric charger information providing unit 223 corresponding to a sub-processor may obtain in real time or periodically collect 'charging related information' (e.g., an electric charger state, an electric charging schedule, etc.) from a plurality of electric chargers (e.g., electric chargers 14a, . . . , 14n), and manage the collected information. In other embodiments, in the case that an electric vehicle reservation is performed, electric charger information providing unit 223 may collect 'charging related information' associated with a corresponding reservation content (e.g., an EV return location). In other words, electric charger information providing unit 223 may collect charging related information associated with one or more electric chargers positioned at a corresponding return location. Electric charger information providing unit 223 may determine 'electric charger information' associated with an electric vehicle return of a corresponding sharing service user. Herein, the electric charger information may include information on one or more electric chargers suitable for the EV sharing service user. More specifically, electric charger information providing unit 223 may determine the electric charger information, based on a reservation content (e.g., an EV return location, a return time, etc.) of a corresponding EV sharing service. Electric charger information providing unit 223 may transmit the electric charger information to user equipment (e.g., 102) of a corresponding sharing service user. When receiving user selection information (e.g., electric charger selection information, an electric charging condition, etc.) from user equipment 102, electric charger information providing unit 223 may perform an electric charging reservation for an electric vehicle to be returned. More specifically, in this case, electric charger information providing unit 223 may transmit an electric charging reservation request to a selected electric charger. Operations of electric charger information providing unit 223 will be described in more detail with reference to FIG. 8.

In other embodiments, each of EV sharing service providing processor 20 and EV charging management processor 22 may be embodied and managed as an independent system (or independent apparatus). In this case, an EV sharing service providing system (or apparatus) corresponding to EV sharing service providing processor 20 and an EV charging management system (or apparatus) corresponding to EV charging management processor 22 may be deployed at different locations. In still other embodiments, the EV sharing service providing system (or apparatus) may be operated and managed by an operating entity performing an electric vehicle sharing service business. Meanwhile, the EV charging management system (or apparatus) may be operated and managed by an operating entity performing an electric vehicle return business. In still other embodiments, electric vehicle (EV) sharing service system 16 may be operated by a data management entity which manages operating data (e.g., data associated with an EV sharing service) of EV sharing service entities.

Figure 3:
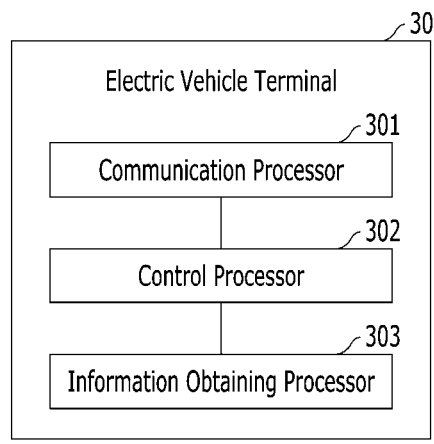
FIG. 3 is a block diagram illustrating an electric vehicle terminal associated with an electric vehicle in accordance with at least one embodiment.

FIG. 3 is a block diagram illustrating an electric vehicle terminal associated with an electric vehicle in accordance with at least one embodiment.

As shown in FIG. 3, electric vehicle terminal 30 installed (or included) in an electric vehicle (e.g., 12) may include communication processor 301, control processor 302, and information obtaining processor 303. Electric vehicle terminal 30 may perform operations described later with reference to FIG. 4 through FIG. 8. Accordingly, the detailed descriptions thereof will be omitted herein. Each constituent element of electric vehicle terminal 30 will be briefly described.

Communication processor 301 may transmit or receive signals, messages, information, and/or data required for performing the present embodiment, in connection with at least one of user equipment 102 (or a corresponding user (e.g., 10)), electric vehicle sharing service system 16, electric charger 14, and electric vehicle 12.

Control processor 302 may control operations of electric vehicle terminal 30. For example, control processor 302 may calculate a remaining battery power, using an electric vehicle utilization time and a mileage. Furthermore, control processor 302 may perform a user authentication procedure (e.g., S524, S554, S624, S644), a lock release process (S416), and/or a locking process (i.e., a process of locking a corresponding electric vehicle) (e.g., S526, S556, S626, S646). Control processor 302 may create a variety of messages (e.g., a user authentication request, an electric vehicle return request, a locking completion message, etc.) to be transmitted to electric vehicle sharing service system 16. Control processor 302 may process messages (e.g., an authentication result message, a return failure message, a return approval message, etc.) received from electric vehicle sharing service system 16.

Information obtaining processor 303 may obtain user authentication information (e.g., membership identification information stored in the membership card, authentication information stored in the authentication chip, a password, etc.) from a variety of authentication means (e.g., a membership card, an authentication chip, and so forth). Furthermore, information obtaining processor 303 may obtain information required to determine whether a return condition is satisfied (i.e., information associated with a return condition). For example, information obtaining processor 303 may obtain location information of a corresponding electric vehicle using a global positioning system (GPS). Furthermore, information obtaining processor 303 may obtain information on a remaining battery power of the electric vehicle, from a battery management system of the electric vehicle. In other embodiments, information obtaining processor 303 may further obtain an electric vehicle utilization time and a mileage associated with a corresponding EV sharing service. In still other embodiments, information obtaining processor 303 may obtain connection information by monitoring whether an electric vehicle (e.g., electric vehicle 12) is connected to electric charger 14.

Figure 4:
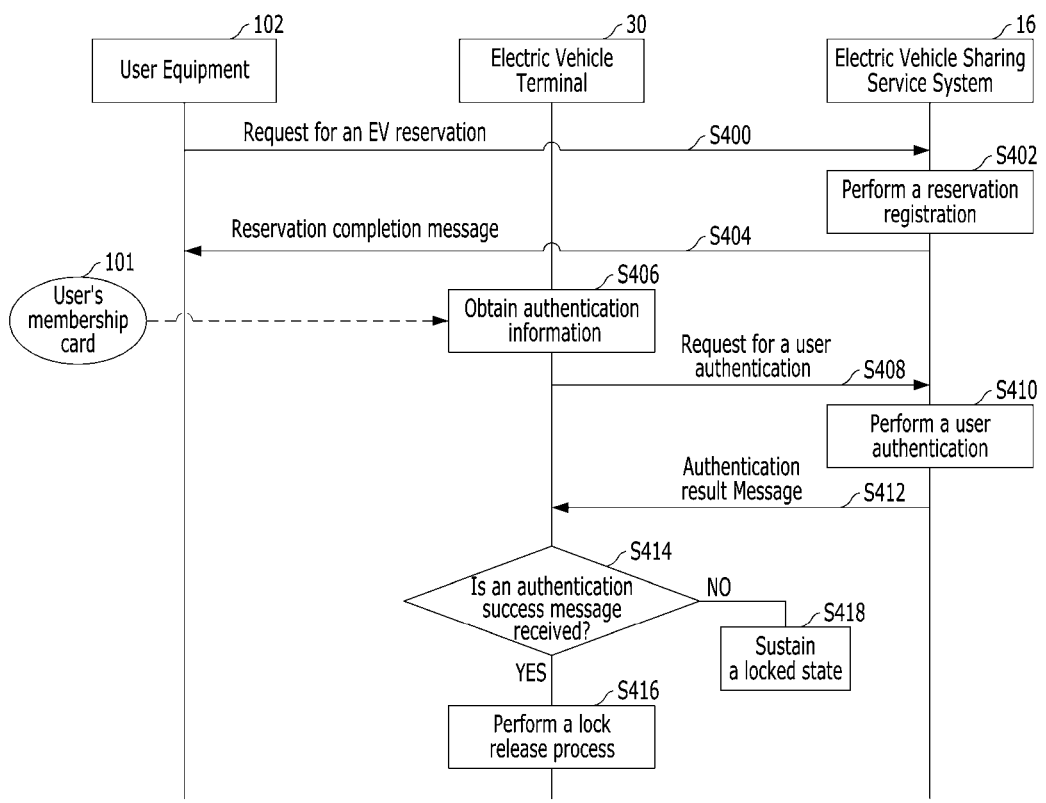
FIG. 4 illustrates a method of performing an electric vehicle reservation process and an initiation process for utilization of an electric vehicle in an electric vehicle sharing service in accordance with at least one embodiment.

FIG. 4 illustrates a method of performing an electric vehicle reservation process and an initiation process for utilization of an electric vehicle in an electric vehicle sharing service in accordance with at least one embodiment.

Referring to FIG. 4, at step S400, when a user wants to use an electric vehicle (EV) sharing service, the user may perform a request procedure for an electric vehicle (EV) reservation to electric vehicle (EV) sharing service system 16, through user equipment 102. Herein, the user may be a subscriber (i.e., a service member) of the electric vehicle (EV) sharing service. The user may perform the reservation request procedure, using user equipment 102 such as a desktop computer, a laptop, a mobile terminal, a smart phone, and so forth. More specifically, if user equipment 102 is connected to electric vehicle (EV) sharing service system 16, a corresponding user may perform a reservation request through a selection of menu information provided by electric vehicle (EV) sharing service system 16. The request for an electric vehicle (EV) reservation may include reservation information such as a rental location (i.e., a pick up location, a return location), a vehicle model, a reservation time (e.g., a starting time and an end time of a sharing service), and so forth.

At step S402, when receiving the reservation request, electric vehicle (EV) sharing service system 16 may perform a reservation registration procedure. In this case, electric vehicle (EV) sharing service system 16 may store and manage reservation information (i.e., a reservation content) associated with the reservation request.

At step S404, when a reservation registration procedure is complete, electric vehicle (EV) sharing service system 16 may send a reservation completion message to user equipment 102.

Thereafter, a corresponding user may use an electric vehicle according to a corresponding reservation content (e.g., an EV pick up location, an EV return location, a vehicle model, a reservation time, etc.). In this case, the user may get a user authentication using a variety of authentication means (e.g., a membership card, an authentication chip, and so forth). At step S406, electric vehicle (EV) terminal 30 may obtain authentication information (e.g., membership identification information stored in the membership card, authentication information stored in the authentication chip). In other embodiments, in the case that an electric vehicle has a key input unit for a door open or close operation, a user may input authentication information (e.g., a password, a membership identification, etc.) through the key input unit. Herein, the key input unit may be installed in an electric vehicle door, and is connected to electric vehicle (EV) terminal 30. In this case, electric vehicle (EV) terminal 30 may obtain the authentication information inputted by the user through the key input unit.

At step S408, electric vehicle (EV) terminal 30 may transmit 'a request for a user authentication' (may be simply referred to as "a user authentication request) to electric vehicle (EV) sharing service system 16. Herein, the request for a user authentication may include the authentication information obtained at step S406.

At step S410, when receiving the user authentication request from electric vehicle (EV) terminal 30, electric vehicle (EV) sharing service system 16 may perform a user authentication procedure. More specifically, electric vehicle (EV) sharing service system 16 may perform a user authentication procedure, using the authentication information received at step S408 and the reservation information (i.e., reservation contents) registered at step S402.

At step S412, electric vehicle (EV) sharing service system 16 may transmit an authentication result message to electric vehicle (EV) terminal 30. More specifically, when the user authentication is successful, electric vehicle (EV) sharing service system 16 may transmit an authentication success message. When the user authentication fails, electric vehicle (EV) sharing service system 16 may transmit an authentication failure message.

When the authentication success message is received (Yes—S414), electric vehicle (EV) terminal 30 may perform a lock release process (i.e., an initiation process for utilization of a corresponding electric vehicle) at step S416. More specifically, electric vehicle (EV) terminal 30 may release a door lock and a power button (or start button) locking of a corresponding electric vehicle such that the user may use the electric vehicle. Herein, the power button (or start button) of an electric vehicle may correspond to an ignition lock of a typical engine car.

When the authentication failure message is received (No—S414), electric vehicle (EV) terminal 30 may sustain a locked state at step S418. In this case, the user may not use a corresponding electric vehicle.

FIG. 5A through 5C illustrate a method of performing a return process of an electric vehicle in an electric vehicle sharing service in accordance with at least one embodiment.

When a user wants to return an electric vehicle, the user may park the electric vehicle to be returned, at a predetermined return location (i.e., a return location determined at step S400), and proceed with an electric vehicle return procedure. More specifically, the user may select an electric vehicle return request on a menu provided by electric vehicle terminal 30. In other words, at step S500, electric vehicle terminal 30 may receive a user input for an electric vehicle return request. In other embodiments, a corresponding user may transmit an electric vehicle return request to electric vehicle sharing service system 16. In this case, the electric vehicle return request may include user identification information, and/or identification information on an electric vehicle to be returned.

At step S502, electric vehicle terminal 30 may obtain 'information required to determine whether a return condition is satisfied' (i.e., information associated with a return condition). For example, electric vehicle terminal 30 may obtain location information of the electric vehicle using a global positioning system (GPS). Furthermore, electric vehicle terminal 30 may obtain information on a remaining battery power amount of the electric vehicle, from a battery management system of the electric vehicle. In other embodiments, electric vehicle terminal 30 may further obtain user authentication information (e.g., membership identification information stored in the membership card, authentication information stored in the authentication chip, a password, etc.) for an electric vehicle return. In still other embodiments, electric vehicle terminal 30 may further obtain an electric vehicle utilization time and a mileage associated with a corresponding EV sharing service. In this case, electric vehicle terminal 30 may calculate a remaining battery power, using the electric vehicle utilization time and the mileage.

At step S504, electric vehicle terminal 30 may transmit an electric vehicle return request including the obtained information (i.e., information obtained at step S502), to electric vehicle sharing service system 16. Herein, the obtained information may include at least one of the location information of the electric vehicle, the remaining battery power information, the user authentication information, the electric vehicle utilization time, and the mileage.

At step S506, electric vehicle sharing service system 16 may determine whether a first return condition (or may be referred to as "a general return condition") is satisfied. Particularly, electric vehicle sharing service system 16 may determine based on the received information. Herein, the first return condition may include at least one of (i) whether the returned electric vehicle is at a predetermined return location, (ii) a user authentication (i.e., whether a user authentication is successful), and (iii) whether an electric motor (corresponding to 'an engine' of a typical engine vehicle) of the returned electric vehicle is off.

At step S508, when the first return condition is not satisfied (No—S506), electric vehicle sharing service system 16 may transmit an EV return failure message to electric vehicle sharing service system 16.

At step S510, when the first return condition is satisfied (Yes—S506), electric vehicle sharing service system 16 may determine whether a remaining battery power amount exceeds a threshold value. Herein, the threshold value may be determined based on an electric vehicle utilization schedule. The electric vehicle utilization schedule may be a subsequent utilization schedule associated with an electric vehicle to be returned. In other embodiments, in the case that the remaining battery power amount is not included in the electric vehicle return request, electric vehicle sharing service system 16 may calculate a remaining battery power, using the electric vehicle utilization time and the mileage included electric vehicle return request. Herein, a return condition (may be referred to as "a second return condition") associated with an electric charging of a returned electric vehicle may include at least one of (i) whether a remaining battery power amount exceeds a threshold value, (ii) whether a returned electric vehicle is connected to an electric charger, and (iii) a user authentication for electric charging. Hereinafter, for convenience of descriptions, the return condition (ii) or the return condition (ii) and (iii) will be referred to "a second condition."

FIG. 5B or FIG. 5C will be applied according to whether a remaining battery power amount exceeds a threshold value. More specifically, when the remaining battery power amount does not exceed the threshold value, operations shown in FIG. 5B will be performed. When the remaining battery power amount exceeds the threshold value, operations shown in FIG. 5C will be performed. In other embodiments, FIG. 5B or FIG. 5C may be applied according to whether a battery power usage amount (i.e., a battery power usage amount used for an EV sharing service period) exceeds a threshold value.

First, referring to FIG. 5B, at step S520, when the remaining battery power amount does not exceed the threshold value (No—S510), electric vehicle sharing service system 16 may transmit a return approval message and/or charging guide information (i.e., guide information for a connection to an electric charger) to user equipment 102. In other embodiments, electric vehicle sharing service system 16 may transmit a return approval message and/or charging guide information to electric vehicle terminal 30.

A user may get off a corresponding electric vehicle, and initiate a user authentication procedure using a variety of authentication means (e.g., a membership card, an authentication chip, and so forth) as described at step S406 of FIG. 4. At step S522, electric vehicle (EV) terminal 30 may obtain authentication information (e.g., membership identification information stored in the membership card, authentication information stored in the authentication chip, etc.).

At step S524, electric vehicle (EV) terminal 30 may perform the user authentication procedure by comparing "the authentication information obtained at step S532" and "the authentication information obtained at step S406." For example, electric vehicle terminal 30 may perform a user authentication procedure for locking a returned electric vehicle, using the user authentication information obtained in a user authentication process for unlocking the electric vehicle. In other embodiments, as described in FIG. 4, electric vehicle (EV) terminal 30 may transmit the obtained authentication information to electric vehicle sharing service system 16 such that a user authentication procedure is performed in electric vehicle sharing service system 16.

At step S526, when the user authentication is successful, electric vehicle (EV) terminal 30 may perform a process of locking a corresponding electric vehicle. For example, in the case that an electric vehicle is an electric car, electric vehicle (EV) terminal 30 may perform a door locking and a power button (start button) locking for the electric car, in order to prevent an electric vehicle theft and unauthorized driving. In other embodiments, electric vehicle sharing service system 16 may transmit a lock control signal (i.e., a control signal for an electric vehicle locking) to electric vehicle terminal 30 (i) when the first return condition is satisfied (Yes—S506), or (ii) after a determination (S510) associated with whether a remaining battery power exceeds a threshold is performed. In these cases, when receiving a lock control signal from electric vehicle sharing service system 16, electric vehicle (EV) terminal 30 may perform a process of locking a corresponding electric vehicle, without performing operations S522 through S526. In still other embodiments, the electric vehicle locking process (e.g., operations S522 through S526, or a locking process according to a lock control signal) may be performed after a determination (S536) of a second return condition is performed.

A user may select an electric charging request, and perform a charging connection (i.e., a connection for electric charging) between the returned electric vehicle (e.g., electric vehicle 12) and an electric charger (e.g., electric charger 14). More specifically, the user may select an electric charging request on a menu provided by electric charger 14.

When receiving a user input for an electric charging request from a corresponding user at step S528, electric charger 14 may obtain connection information associated with whether an electric vehicle (e.g., electric vehicle 12) is connected to electric charger 14 at step S530. Herein, the connection information may include connection state information (e.g., whether electric vehicle 12 is connected to electric charger 14), vehicle identification information (e.g., a vehicle plate number, a vehicle identification number, etc.), electric charger identification information, a remaining battery power amount, a charging condition (e.g., a charging level, a charging speed, a charging price, etc.) selected by a user, and so forth. Furthermore, a connection of the electric vehicle (e.g., electric vehicle 12) and electric charger 14 may be wired or wirelessly established.

The user may get a user authentication using a variety of authentication means (e.g., a membership card, an authentication chip, and so forth). For example, the user may touch his or her membership card 101 to electric charger 14 (more specifically, a reader of electric charger 14). At step S532, electric charger 14 may obtain authentication information (e.g., membership identification information stored in the membership card, authentication information stored in the authentication chip). In other embodiments, in the case that electric charger 14 has a key input unit or a touch input unit (e.g., a touch screen, etc.), a user may input authentication information (e.g., a password, a membership identification, etc.) through the key input unit or touch input unit. In this case, electric charger 14 may obtain the authentication information inputted by the user through the key input unit or the touch input unit.

At step S534, electric charger 14 may transmit the obtained connection information (S530) and the obtained authentication information (S532) to electric vehicle sharing service system 16.

At step S536, when receiving the connection information (S530) and the authentication information (S532) from electric charger 14, electric vehicle sharing service system 16 may determine whether a second return condition associated with an electric charging of the returned electric vehicle is satisfied. More specifically, electric vehicle sharing service system 16 may determine (i) whether a corresponding electric vehicle is connected to electric charger 14, based on the received connection information, and/or (ii) whether a user authentication is successful, based on the received authentication information.

At step S538, when the second return condition is not satisfied (No—S536), electric vehicle sharing service system 16 may transmit a failure message to electric charger 14. In this case, when receiving the failure message from electric vehicle sharing service system 16, electric charger 14 may display a failure reason such that a corresponding user can recognize the failure reason.

Meanwhile, at step S540, when the second return condition is satisfied (Yes—S536), electric vehicle sharing service system 16 may transmit a charging approval message (i.e., a charging command) to electric charger 14. When receiving the charging approval message from electric vehicle sharing service system 16, electric charger 14 may perform an electric charging process associated with the returned electric vehicle.

At step S542, when the second return condition is satisfied (Yes—S536), electric vehicle sharing service system 16 may transmit information on a charging process to user equipment 102. Herein, the information on a charging process may include a notification that a corresponding returned electric vehicle will be charged.

At step S544, when the second return condition is satisfied (Yes—S536), electric vehicle sharing service system 16 may determine a service expense associated with a corresponding electric vehicle sharing service, and/or a benefit (e.g., an incentive, a discount, etc.) to be provided to a corresponding user.

At step S546, electric vehicle sharing service system 16 may transmit a return completion message to user equipment 102. Herein, the return completion message may include the service expense and/or benefit information determined at step S544. In other embodiments, electric vehicle sharing service system 16 may determine a required electric charging amount and a charging time (i.e., a time to be taken for charging), based on a charging condition (e.g., a charging level, a charging speed, a charging price, etc.). Furthermore, electric vehicle sharing service system 16 may predict an electric charging expense, based on the required electric charging amount, the charging time, and the charging price. In this case, the return completion message may further include the electric charging expense.

Referring to FIG. 5C, at step S550, when the remaining battery power amount exceeds the threshold value (Yes—S510), electric vehicle sharing service system 16 may transmit a return approval message to electric vehicle terminal 30.

A user may get off a corresponding electric vehicle, and initiate a user authentication procedure using a variety of authentication means (e.g., a membership card, an authentication chip, and so forth) as described at step S406 of FIG. 4. At step S552, electric vehicle (EV) terminal 30 may obtain authentication information (e.g., membership identification information stored in the membership card, authentication information stored in the authentication chip, etc.).

At step S554, electric vehicle (EV) terminal 30 may perform the user authentication procedure by comparing "the authentication information obtained at step S552" and "the authentication information obtained at step S406." For example, electric vehicle terminal 30 may perform a user authentication procedure for locking a returned electric vehicle, using the user authentication information obtained in a user authentication process for unlocking the electric vehicle. In other embodiments, as described in FIG. 4, electric vehicle (EV) terminal 30 may transmit the obtained authentication information to electric vehicle sharing service system 16 such that a user authentication procedure is performed in electric vehicle sharing service system 16.

At step S556, when the user authentication is successful, electric vehicle (EV) terminal 30 may perform a process of locking a corresponding electric vehicle. For example, in the case that an electric vehicle is an electric car, electric vehicle (EV) terminal 30 may perform a door locking and a power button (start button) locking for the electric car, in order to prevent an electric vehicle theft and unauthorized driving. In other embodiments, when receiving the return approval message (S550) from electric vehicle sharing service system 16, electric vehicle (EV) terminal 30 may perform a process of locking a corresponding electric vehicle, without performing operations S552 to S556. More specifically, in the case that the return approval message includes a lock control signal (i.e., a control signal for an electric vehicle locking), electric vehicle (EV) terminal 30 may perform a process of locking a corresponding electric vehicle.

At step S558, when the locking process is complete, electric vehicle (EV) terminal 30 may transmit a locking completion message to electric vehicle sharing service system 16.

At step S560, when receiving the locking completion message from electric vehicle (EV) terminal 30, electric vehicle sharing service system 16 may determine a service expense associated with a corresponding electric vehicle sharing service, and/or a benefit (e.g., an incentives, a discount, etc.) to be provided to a corresponding user.

At step S562, electric vehicle sharing service system 16 may transmit a return completion message to user equipment 102. Herein, the return completion message may include the service expense and/or benefit information determined at step S560. In other embodiments, electric vehicle sharing service system 16 may determine a required electric charging amount and a charging time (i.e., a time to be taken for charging), based on a charging condition (e.g., a charging level, a charging speed, a charging price, etc.). Furthermore, electric vehicle sharing service system 16 may predict an electric charging expense, based on the required electric charging amount, the charging time, and the charging price. In this case, the return completion message may further include the electric charging expense.

FIG. 6A and FIG. 6B illustrate other methods of performing an electric vehicle return procedure in the case that a remaining battery power amount does not exceed a threshold value in accordance with at least one embodiment. More specifically, the electric vehicle return procedure described in FIG. 6A and FIG. 6B may be performed in place of a procedure in FIG. 5B after a procedure described in FIG. 5A.

Referring to FIG. 6A, at step S620, when the remaining battery power amount does not exceed the threshold value (No—S510), electric vehicle sharing service system 16 may transmit a return approval message and/or charging guide information (i.e., guide information for a connection to an electric charger) to user equipment 102.

A user may get off a corresponding electric vehicle, and initiate a user authentication procedure using a variety of authentication means (e.g., a membership card, an authentication chip, and so forth) as described at step S406 of FIG. 4. At step S622, electric vehicle (EV) terminal 30 may obtain authentication information (e.g., membership identification information stored in the membership card, authentication information stored in the authentication chip, etc.).

At step S624, electric vehicle (EV) terminal 30 may perform the user authentication procedure by comparing "the authentication information obtained at step S532" and "the authentication information obtained at step S406." For example, electric vehicle terminal 30 may perform a user authentication procedure for locking a returned electric vehicle, using the user authentication information obtained in a user authentication process for unlocking the electric vehicle. In other embodiments, as described in FIG. 4, electric vehicle (EV) terminal 30 may transmit the obtained authentication information to electric vehicle sharing service system 16 such that a user authentication procedure is performed in electric vehicle sharing service system 16.

At step S626, when the user authentication is successful, electric vehicle (EV) terminal 30 may perform a process of locking a corresponding electric vehicle. For example, in the case that an electric vehicle is an electric car, electric vehicle (EV) terminal 30 may perform a door locking and a power button (start button) locking for the electric car, in order to prevent an electric vehicle theft and unauthorized driving. In other embodiments, electric vehicle sharing service system 16 may transmit a lock control signal (i.e., a control signal for an electric vehicle locking) to electric vehicle terminal 30 (i) when the first return condition is satisfied (Yes—S506), or (ii) after a determination (S510) associated with whether a remaining battery power exceeds a threshold is performed. In this case, when receiving a lock control signal from electric vehicle sharing service system 16, electric vehicle (EV) terminal 30 may perform a process of locking a corresponding electric vehicle, without performing operations S622 through S626. In still other embodiments, an electric vehicle locking process (e.g., operations S622 through S626, or a locking process according to a lock control signal) may be performed after a determination (S632) of a second return condition is performed.

At step S628, electric vehicle terminal 30 may monitor whether an electric vehicle (e.g., electric vehicle 12) is connected to electric charger 14. Herein, a connection of the electric vehicle (e.g., electric vehicle 12) and electric charger 14 may be wired or wirelessly established. Furthermore, in the case that electric vehicle 12 is connected to electric charger 14, electric vehicle terminal 30 may obtain a charging condition (e.g., a charging level, a charging speed, a charging price, etc.) selected by a user.

At step S630, electric vehicle terminal 30 may transmit connection information to electric vehicle sharing service system 16. Herein, the connection information may include connection state information (e.g., whether electric vehicle 12 is connected to electric charger 14), vehicle identification information (e.g., a vehicle plate number, a vehicle identification number, etc.), electric charger identification information, a remaining battery power amount, a charging condition (e.g., a charging level, a charging speed, a charging price, etc.) selected by a user, and so forth.

At step S632, when receiving the connection information from electric vehicle terminal 30, electric vehicle sharing service system 16 may determine whether a second return condition associated with an electric charging of the returned electric vehicle is satisfied. More specifically, electric vehicle sharing service system 16 may determine whether a corresponding electric vehicle is connected to electric charger 14, based on the received connection information.

At step S634, when the second return condition is not satisfied (No—S632), electric vehicle sharing service system 16 may transmit a connection guide message (i.e., a request for a charging connection to an electric charger) to user equipment 102. In this case, if a user connects a corresponding electric vehicle to electric charger 14 within a predetermined time period, electric vehicle terminal 30 may detect the charging connection, and transmit connection information to electric vehicle sharing service system 16. In other embodiments, in the case that a returned electric vehicle is not connected to electric charger 14 within a predetermined time period, electric vehicle sharing service system 16 may impose a penalty on the corresponding user.

Meanwhile, at step S636, when the second return condition is satisfied (Yes—632), electric vehicle sharing service system 16 may determine a service expense associated with a corresponding electric vehicle sharing service, and/or a benefit (e.g., an incentive, a discount, etc.) to be provided to a corresponding user. In other embodiments, when the second return condition is satisfied (Yes—632), electric vehicle sharing service system 16 may further perform an operation (S540) transmitting a charging approval message, and an operation (S542) transmitting information on a charging process, as described in FIG. 5B.

At step S638, electric vehicle sharing service system 16 may transmit a return completion message to user equipment 102. Herein, the return completion message may include the service expense and/or benefit information determined at step S636. In other embodiments, electric vehicle sharing service system 16 may determine a required electric charging amount and a charging time (i.e., a time to be taken for charging), based on a charging condition (e.g., a charging level, a charging speed, a charging price, etc.). Furthermore, electric vehicle sharing service system 16 may predict an electric charging expense, based on the required electric charging amount, the charging time, and the charging price. In this case, the return completion message may further include the electric charging expense.

In other embodiments, as shown in FIG. 6B, an EV sharing service user may connect a returned electric vehicle to an electric charger positioned at a predetermined location, and directly initiate a return procedure for a second return condition (S654) using user equipment 102. In FIG. 6B, operations S640 to S646, and S654 to S660 may be the same as or similar to operations S620 to S626, and S632 to S638. Accordingly, since the operations S620 to S626, and S632 to S638 were already described with reference to FIG. 6A, the detailed description of the operations S640 to S646, and S654 to S660 are omitted. Furthermore, in other embodiments, when the second return condition is satisfied (Yes—654), electric vehicle sharing service system 16 may further perform an operation (S540) transmitting a charging approval message, and an operation (S542) transmitting information on a charging process, as described in FIG. 5B.

At step S648, user equipment 102 may transmit an electric charging authentication request to electric vehicle sharing service system 16. Herein, the electric charging authentication request may include identification information (e.g., electric charger identification number) on an electric charger connected to a returned electric vehicle.

When receiving the electric charging authentication request from user equipment 102, electric vehicle sharing service system 16 may identify a corresponding electric charger (e.g., 14) using the identification information included in the electric charging authentication request. At step S650, electric vehicle sharing service system 16 may transmit a connection information request (i.e., a request for charging connection information) to the identified electric charger 14.

At step S652, when receiving the connection information request from electric vehicle sharing service system 16, electric charger 14 may transmit connection information (i.e., charging connection information) to electric vehicle sharing service system 16. Herein, the connection information may include connection state information (i.e., whether an electric vehicle (e.g., electric vehicle 12) is connected to electric charger 14), vehicle identification information (e.g., a vehicle plate number, a vehicle identification number, etc.), a remaining battery power amount, a charging condition (e.g., a charging level, a charging speed, a charging price, etc.) selected by a user, and so forth.

FIGS. 7A and 7B illustrate return states of an electric vehicles returned after using electric vehicle sharing services in accordance with at least one embodiment. Particularly, FIGS. 7A and 7B illustrate whether a retuned electric vehicle is connected to an electric charger. Furthermore, FIG. 7A illustrates a wired connection for an electric charging, and FIG. 7B illustrates a wireless connection for an electric charging.

Referring to FIG. 7A and FIG. 7B, electric chargers (e.g., 14a, 14b, 721) may be deployed at various positions (e.g., a parking lot, a parking district of a road) associated with an electric vehicle return. As shown in FIG. 7A and FIG. 7B, a parking lot or a parking district may include a charging zone (e.g., 700, 720) and a non-charging zone (e.g., 710, 730). Herein, the charging zone (e.g., 700, 720) may indicate a parking zone where an electric charger (e.g., 14a, 14b, or 721) is deployed. The non-charging zone (e.g., 710, 730) may indicate a parking zone where an electric charger (e.g., 14a, 14b, or 721) is not deployed.

As shown in FIG. 7A, electric chargers 14a and 14b may indicate wired chargers using a wired charging scheme. With respect to the wired charging scheme, a user of a returned electric vehicle may connect a charging plug of a corresponding electric charger to a returned electric vehicle. Alternatively, the user may connect a charging plug of the returned electric vehicle to a corresponding electric charger, according to types of electric vehicles. Meanwhile, as shown in FIG. 7B, electric charger 721 may indicate a wireless charger using a wireless charging scheme, and be deployed on or under the ground. With respect to the wireless charging scheme, a wireless connection for a wireless electric charging may be established by positioning an electric vehicle within a wireless charging zone.

As shown described in FIG. 7A and FIG. 7B, an EV sharing service user may park a returned electric vehicle at a charging zone or a non-charging zone. For example, an EV sharing service user may park an electric vehicle (e.g., 12a, 12c) at a charging zone (e.g., 700), or park an electric vehicle (e.g., 12b or 12d) at a non-charging zone (e.g., 710 or 730). Although a returned electric vehicle is parked at a charging zone, the returned electric vehicle may be disconnected from an electric charger. In other words, a user may not connect a charging plug of an electric charger to his/her returned electric vehicle.

As described in FIG. 5A, in the present embodiment, a first return condition (i.e., a general return condition) (S506) may be determined regardless of whether a returned electric vehicle is positioned at a charging zone or a non-charging zone. In other words, in the case that a returned electric vehicle is positioned at a predetermined return location, a first return condition may be determined to be satisfied. Accordingly, as described in FIG. 5B through FIG. 6B, the present embodiment may require a second return condition (e.g., a return condition associated with an electric charging of a returned electric vehicle, for example, S510, S536, S632, and/or S654) in order to induce a user's charging connection (i.e., a charging connection between a returned electric vehicle and an electric charger). More specifically, in the case that (i) a returned electric vehicle is not parked at non-charging zone, or (ii) a returned electric vehicle parked at a charging zone is disconnected from an electric charger, the second return condition may be determined to not be satisfied.

FIG. 8 illustrates a method of performing an electric charging reservation for an electric vehicle to be returned, in accordance with at least one embodiment.

Referring to FIG. 8, at steps S800 through S804, electric vehicle sharing service system 16 may in real time or periodically collect 'charging related information' from a plurality of electric chargers (e.g., electric chargers 14a, 14b, . . . , 14n), and manage the collected information. Herein, the charging related information may include information on an electric charger state (e.g., whether an electric charger is properly operated, etc.) and an electric charging schedule associated with a corresponding electric charger (e.g., electric charger 14a, 14b, . . . , or 14n). In other embodiments, in the case that an electric vehicle reservation is performed as shown in FIG. 4, electric vehicle sharing service system 16 may collect 'charging related information' associated with a corresponding reservation content (e.g., an EV return location). In other words, electric vehicle sharing service system 16 may collect charging related information associated with one or more electric chargers positioned at a corresponding return location.

At step S806, electric vehicle sharing service system 16 may determine 'electric charger information' associated with an electric vehicle return for each EV sharing service user. Herein, the electric charger information may include information on one or more electric chargers suitable for each EV sharing service user. More specifically, electric vehicle sharing service system 16 may determine the electric charger information, based on a reservation content (e.g., an EV return location, a return time, etc.) of a corresponding EV sharing service. Furthermore, electric vehicle sharing service system 16 may determine optimal electric charger information, based on at least one of an sharing vehicle model, a predicted battery power consumption amount according to a reservation content, an electric charger location, an electric charger state, and an electric charging schedule of an electric charger.

At step S808, electric vehicle sharing service system 16 may transmit electric charger information to user equipment (e.g., 102) of each sharing service user.

When user equipment 102 receives electric charger information from electric vehicle sharing service system 16, a corresponding sharing service user may determine or select a specific electric charger (e.g., electric charger 14*a*) for charging the electric vehicle to be returned, and/or a charging condition (e.g., an electric charging level, an electric charging time, an electric charging price, etc.). In this case, at step S810, user equipment 102 may receive a user selection (e.g., electric charger selection information, an electric charging condition, etc.) associated with an electric charger, from the corresponding sharing service user.

At step S812, user equipment 102 may transmit the user selection information to electric vehicle sharing service system 16.

At step S814, when receiving the user selection information from user equipment 102, electric vehicle sharing service system 16 may perform an electric charging reservation for an electric vehicle to be returned. More specifically, electric vehicle sharing service system 16 may perform an electric charging reservation, based on the received user selection information. For example, in the case that an EV sharing service user selects electric charger 14*a*, electric vehicle sharing service system 16 may perform the electric charging reservation in connection with electric charger 14*a*. More specifically, in this case, electric vehicle sharing service system 16 may transmit an electric charging reservation request to electric charger 14*a*. Herein, the electric charging reservation request may include an electric charging condition (e.g., a charging level, a charging time, a charging price, etc.) and/or an electric charging date and time. When receiving the electric charging reservation request from electric vehicle sharing service system 16, electric charger 14*a* may establish an electric charging schedule for the electric vehicle to be returned, according to the received electric charging reservation request.

Such an electric charging reservation procedure may be performed when an electric vehicle reservation process (S400 through S404) is performed, or anytime during a corresponding EV sharing service period. In this case, an EV sharing service user may performing an electric charging reservation through user equipment (e.g., a smart phone, a personal computer, etc.) or an electric vehicle terminal (e.g., electric vehicle terminal 30).

As described above, according to the present embodiment, a battery power amount of a returned electric vehicle may be properly sustained for a next EV sharing service. Accordingly, an electric charging management for a returned electric vehicle may be efficiently performed, and therefore an electric vehicle sharing service may be efficiently operated.

Furthermore, the present embodiment may enable an electric charging for a returned electric vehicle without extra workers, and reduce personnel expenses for an electric charging of the returned electric vehicle. Accordingly, the present embodiment may lower an EV sharing service price.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of managing an electric vehicle return process in an electric vehicle sharing service system, the method comprising:
   receiving, by the electric vehicle sharing service system, a return request for an electric vehicle from at least one of user equipment and an electric vehicle terminal;
   determining, by the electric vehicle sharing service system, whether a first return condition is satisfied in response to the return request, wherein the first return condition includes whether the electric vehicle is at a predetermined return location, whether a user authentication is successful, and whether an electric motor of the returned electric vehicle is off;
   determining, by the electric vehicle sharing service system, whether a second return condition associated with an electric charging of the electric vehicle is satisfied in response to the return request, wherein the second condition checks a charging connection between the electric vehicle and an electric charger, determining whether a remaining battery power of the electric vehicle exceeds a threshold value, and performs a user authentication; and
   determining, by the electric vehicle sharing service system, that an electric vehicle return procedure is complete when the first and second return conditions are satisfied.

2. The method of claim 1, wherein the determining the second return condition includes:
   receiving charging connection information from at least one of the electric vehicle terminal of the electric vehicle and the electric charger connected to the electric vehicle; and
   determining whether the charging connection is established, based on the received charging connection information.

3. The method of claim 1, wherein the charging connection is established according to at least one of a wired charging scheme and a wireless charging scheme.

4. The method of claim 1, wherein the remaining battery power is obtained from the electric vehicle terminal or the electric charger connected to the electric vehicle; and
   the determining the second return condition is performed when the remaining battery power of the electric vehicle exceeds the threshold value.

5. The method of claim 1, further comprising:
   determining a benefit for a corresponding user when the second return condition is satisfied; and
   transmitting information on the benefit to the user equipment.

6. The method of claim 1, further comprising:
   transmitting a guide message requesting an electric charging connection, to user equipment when the second return condition is not satisfied.

7. The method of claim 6, further comprising:
   determining a penalty for a corresponding user when the second return condition is not satisfied; and
   transmitting information on the penalty to the user equipment.

8. The method of claim 1, further comprising:
   transmitting a charging approval message to the connected electric charger such that the connected electric charger performs an electric charging process, when the second return condition is satisfied; and
   transmitting information on the electric charging process to the user equipment.

9. The method of claim 1, further comprising:
   transmitting a lock control signal to the electric vehicle terminal such that the electric vehicle terminal performs a locking process for the electric vehicle.

10. The method of claim 1, further comprising:
    performing an electric charging reservation for the electric vehicle.

11. The method of claim 10, wherein the performing the electric charging reservation includes:
    collecting charging related information from one or more electric chargers;
    determining availability of at least one electric charger for an electric vehicle return of each user, based on an electric vehicle reservation content;
    providing information on the determined at least one electric charger to a corresponding user equipment;
    receiving user selection information from the corresponding user equipment; and
    performing the electric charging reservation according to the user selection information.

12. The method of claim 2, wherein the receiving the charging connection information includes:
    receiving an electric charging authentication request from the user equipment;
    obtaining electric charger identification information from the electric charging authentication request;

transmitting a charging connection information request to an electric charger corresponding to the electric charger identification information; and receiving the charging connection information from the corresponding electric charger.

13. A method of managing an electric vehicle return process in an electric vehicle sharing service system, the method comprising:

receiving, by the electric vehicle sharing service system, a return request for an electric vehicle from at least one of user equipment and an electric vehicle terminal;

determining, by the electric vehicle sharing service system, whether a first return condition is satisfied in response to the return request, wherein the first return condition includes whether the electric vehicle is at a predetermined return location, whether a user authentication is successful, and whether an electric motor of the returned electric vehicle is off;

determining, by the electric vehicle sharing service system, whether a second return condition associated with an electric charging of the electric vehicle is satisfied in response to the return request, wherein the second condition checks a charging connection between the electric vehicle and an electric charger, determining whether a remaining battery power of the electric vehicle exceeds a threshold value, and performs a user authentication;

determining, by the electric vehicle sharing service system, that an electric vehicle return procedure is complete when the first and second return conditions are satisfied;

determining a benefit for a corresponding user when the remaining battery power of the electric vehicle exceeds the threshold value; and transmitting information on the benefit to the user equipment.

* * * * *